United States Patent Office 2,698,311
Patented Dec. 28, 1954

2,698,311

PROCESS OF CATALYZING A POLYMERIZATION REACTION UTILIZING A LIQUID WATER-INSOLUBLE CATALYST EMULSION

Jack D. Robinson, Darien, Conn., assignor to American Cyanamid Company, New York, N. Y., a corporation of Maine No Drawing. Application April 4, 1951,
Serial No. 219,326

1 Claim. (Cl. 260—45.4)

This invention relates to a catalyst composition and a method of catalysis. More particularly, it relates to a catalyst composition comprising a water emulsion of a polymerization catalyst and a method of catalyzing the polymerization reaction of a water emulsion of a polymerizable mixture containing an unsaturated alkyd resin and a material having a $CH_2=C<$ grouping and a boiling point of at least 60° C. which is copolymerizable therewith, which method comprises incorporating the catalyst composition into the emulsion of polymerizable mixture and subsequently curing said polymerizable mixture.

The emulsions of polymerizable mixtures discussed herein and their methods of preparation are fully described in U. S. Patents Nos. 2,443,735 and 2,473,801.

The prior art methods of preparing these catalyst-containing polymerizable mixtures in emulsified form have been greatly varied. A preferred prior art method of effecting catalysis is to dissolve a polymerization catalyst in the polymerizable mixture prior to its emulsification in water. A great disadvantage of such a method is that the catalyst-containing polymerizable mixture is unstable and has a relatively short storage life. As a consequence, the mixture tends to gel within the emulsion, and within a short time the emulsion becomes unfit for such purposes as impregnating and the like. To avoid this disadvantage, the prior art discloses that the catalyst may be added directly to the emulsion. In such instances, however, it is often difficult to achieve the necessary intimate contact between the catalyst and the polymerizable mixture, particularly so when water is the continuous phase of the emulsion. Therefore, according to the prior art, it is preferred to add a water-soluble catalyst when water is the continuous phase of the emulsion of polymerizable mixture. Here again the limited solubility of the water-soluble catalyst limits its effect on the polymerizable mixture.

This invention provides a new and novel catalyst composition and an easy and simple means of catalyzing the polymerization reaction of the above mentioned water emulsions of polymerizable mixtures in which water is the continuous phase. It is an advantage of this invention that the catalyst-containing polymerizable mixtures may be prepared in emulsion form without using a water-soluble catalyst and without the accompanying difficulty which has hitherto been experienced when it was attempted to use a water-insoluble catalyst.

According to this invention, I have found that certain organic peroxide catalysts may be emulsified with water to form an emulsion in which water is the continuous phase. Surprisingly, the catalyst forms a stable emulsion and it is not deleteriously affected by the presence of the water. It has been further found that these new and novel catalyst compositions may be admixed by simple mechanical dispersion with the above described water emulsion of polymerizable mixtures in which water is the continuous phase whereby an intimate contact between the catalyst and polymerizable mixture is obtained. The polymerizable mixture may then be cured by any conventional means.

The catalyst compositions may be prepared by conventional methods well known to those skilled in the art. The following examples are illustrative:

Example 1

An emulsion of tertiary butyl perbenzoate was prepared according to the following formula:

| | Parts by weight |
|---|---|
| Tertiary butyl perbenzoate | 10 |
| Sodium lauryl sulfate | 2 |
| Methyl cellulose | 1.3 |
| Water | 86.7 |

This mixture was then processed in a colloid mill. There resulted an emulsion of catalyst in which water was the continuous phase. Particle size in the emulsion ranged from 1 to 4 microns with the bulk of the particles 1 to 2 microns.

In preparing the catalyst compositions we employ a liquid, water-insoluble, organic peroxide. Examples of such peroxides are tertiary butyl perbenzoate, acetyl peroxide, caprylyl peroxide, and 2,2 bis (tertiary butyl) perbenzoate. The concentration of catalyst in the emulsion may vary within wide limits, but the preferred range is within 1 to 50 parts catalyst to 99 to 50 parts water by weight.

Any suitable emulsifying agent may be used in preparing the catalyst emulsion. Examples of such agents are gum ghatti, ammonium oleate, triethanolamine oleate, alcohol sulfates, alkyl sulfonates, polyvinyl alcohol, and sulfated and sulfonated esters and amides.

These catalyst compositions may be easily dispersed into water emulsion of a polymerizable mixture of the type hereinbefore described to provide intimate contact between the mixture and the catalyst. The resulting emulsion is then ready for use. Normally the water will be removed prior to effecting cure of the polymerizable mixture. The following examples are illustrative:

Example 2

A water emulsion in which water is the continuous phase is prepared from 55 parts water and 45 parts by weight of a polymerizable mixture containing 20% diallyl phthalate and 80% ethylene glycol fumarate by weight. Ten parts by weight of the catalyst composition prepared in Example 1 are added to the emulsion of polymerizable mixture and admixed by hand-stirring. Twenty-five parts by weight of 20 mesh sulfite pulp are then added to the emulsion with further stirring. The resulting slurry was tray dried for 24 hours at 40° C. to remove the water. The resin impregnated pulp was then formed into a molded piece using a pressure of 25 p. s. i. and a temperature of 150° C. for twenty minutes. The Barcol hardness of the molded piece was 30 to 40.

Example 3

The procedure of Example 2 was followed except that the addition of catalyst was omitted. The molded piece, being very soft, had a Barcol hardness of zero.

The catalyst composition may be added to the emulsion of polymerizable mixture in quantities preferably ranging by weight from 0.1 part to 10 parts catalyst per 100 parts of polymerizable mixture, but these limitations are not critical. It is merely necessary to use enough catalyst to effectively aid the cure of the polymerizable mixture and it is advisable to avoid using so much catalyst that the properties of the cured mixture will be adversely affected.

I claim:

A process which comprises the steps of mechanically dispersing an emulsion consisting essentially of water, emulsifying agent and tertiary butyl perbenzoate in a water emulsion of a polymerizable mixture containing a polymerizable polyester of a polyhydric alcohol and an ethylenically unsaturated polycarboxylic acid and a material having a $CH_2=C<$ grouping and a boiling point of at least 60° C. which is copolymerizable therewith, heating to evaporate the water from the mixture to form a catalyst-containing polymerizable mixture, and curing the catalyst-containing polymerizable mixture by the further application of heat.

References Cited in the file of this patent

UNITED STATES PATENTS

| Number | Name | Date |
|---|---|---|
| 2,343,091 | Smith | Feb. 29, 1944 |
| 2,403,709 | Dickey | July 9, 1946 |
| 2,433,831 | Auer | Jan. 6, 1948 |
| 2,443,735 | Kropa | June 22, 1948 |
| 2,473,801 | Kropa | June 21, 1949 |
| 2,475,016 | De Nie | July 5, 1949 |
| 2,475,731 | Weith | July 12, 1949 |
| 2,497,323 | Roedel | Feb. 14, 1950 |
| 2,500,122 | Dixon et al. | Mar. 7, 1950 |
| 2,580,315 | Park | Dec. 25, 1951 |
| 2,609,362 | Fryling et al. | Sept. 2, 1952 |